(12) United States Patent
Farahanisamani et al.

(10) Patent No.: US 11,710,472 B2
(45) Date of Patent: Jul. 25, 2023

(54) IN-SEAT ACTIVE NOISE CANCELLATION SYSTEM FOR MOVING VEHICLES

(71) Applicant: AVATRONICS SA, Lausanne (CH)

(72) Inventors: Amirhooshang Farahanisamani, Lausanne (CH); Jeyran Hezaveh, Lausanne (CH); Finn Moller, Ry (DK)

(73) Assignee: AVATRONICS SA, Lausanne (CH)

( * ) Notice: Subject to any disclaimer, the term of this patent is extended or adjusted under 35 U.S.C. 154(b) by 0 days.

(21) Appl. No.: 18/009,271

(22) PCT Filed: Jun. 11, 2021

(86) PCT No.: PCT/EP2021/065769
§ 371 (c)(1),
(2) Date: Dec. 8, 2022

(87) PCT Pub. No.: WO2021/250237
PCT Pub. Date: Dec. 16, 2021

(65) Prior Publication Data
US 2023/0197048 A1 Jun. 22, 2023

(30) Foreign Application Priority Data

Jun. 11, 2020 (EP) .................................... 20179589

(51) Int. Cl.
G10K 11/178 (2006.01)
B60N 2/879 (2018.01)
F02K 1/34 (2006.01)

(52) U.S. Cl.
CPC ........ G10K 11/17823 (2018.01); B60N 2/879 (2018.02); B64D 33/06 (2013.01);
(Continued)

(58) Field of Classification Search
CPC ... G10K 2210/3038; G10K 2210/1281; G10K 11/17823
See application file for complete search history.

(56) References Cited

U.S. PATENT DOCUMENTS

| 9,424,828 B2 | 8/2016 | Warkentin et al. |
| 10,347,236 B1 | 7/2019 | Bastyr et al. |
| (Continued) | | |

FOREIGN PATENT DOCUMENTS

| EP | 1 124 218 | 8/2001 |
| EP | 2 840 568 | 2/2015 |

OTHER PUBLICATIONS

Berthilsson, Simon, et al., "MIMO Design of Active Noise Controllers for Car Interiors: Extending the Silenced Region at Higher Frequencies", 2012 American Control Conference, Jun. 27-Jun. 29, 2012, pp. 6140-6147.

(Continued)

*Primary Examiner* — Ping Lee
(74) *Attorney, Agent, or Firm* — Nixon & Vanderhye P.C.

(57) ABSTRACT

An active noise cancellation system (1) for cancelling environment noise perceived by a driver or passenger seated in a seat (3) mounted in a cabin of a vehicle, in combination with said seat, the seat comprising a seat cushion (19), a seat back (21) coupled to the seat cushion at a bottom end and extending upwards to a seat shoulder (23), and a headrest (22) coupled to the seat back, extending upwardly from the seat shoulder, the active noise cancellation system comprising an active noise cancellation circuit (ANC) (30), a plurality of microphones (10) mounted in the headrest and connected electrically to the ANC, and a plurality of speakers (16) mounted in the seat and connected electrically to the ANC circuit. The plurality of microphones comprises at least one first microphone mounted on a right side of the headrest and at least one second microphone mounted on a left side of the headrest, and the plurality of speakers comprises at least one first speaker mounted in the seat shoulder on a left side and at least one second speaker mounted in the seat shoulder on a right side, the right speaker configured to generate a noise cancellation sound (Continued)

from a noise signal picked up by the right microphone processed by the ANC circuit and the left speaker configured to generate a noise cancellation sound from a noise signal picked up by the left microphone processed by the ANC circuit.

15 Claims, 5 Drawing Sheets

(52) U.S. Cl.
CPC .. *G10K 11/17825* (2018.01); *G10K 11/17881* (2018.01); *G10K 2210/1281* (2013.01); *G10K 2210/12821* (2013.01); *G10K 2210/3026* (2013.01); *G10K 2210/3027* (2013.01); *G10K 2210/3028* (2013.01); *G10K 2210/3038* (2013.01); *G10K 2210/3044* (2013.01); *G10K 2210/3046* (2013.01); *G10K 2210/30231* (2013.01)

(56) References Cited

U.S. PATENT DOCUMENTS

| | | |
|---|---|---|
| 10,403,258 B2 | 9/2019 | Zafeiropoulos |
| 2013/0243225 A1 | 9/2013 | Yokota |
| 2016/0027428 A1 | 1/2016 | Gul et al. |
| 2017/0287463 A1 | 10/2017 | Christoph |
| 2020/0043459 A1 | 2/2020 | Itabashi et al. |

OTHER PUBLICATIONS

International Search Report and Written Opinion of the ISA dated Jul. 23, 2021, for PCT/EP2021/065769, 19 pp.
International Preliminary Report on Patentability with Amended Sheets dated May 25, 2022, for PCT/EP2021/065769, 13 pp.
Debi Prasad Das et al., "Nonlinear active noise control for headrest using virtual microphone control", Control Engineering Practice, vol. 21, No. 4, Dec. 27, 2012, pp. 544-555.
A. Roshdy et al., "Towards Human Brain Image Mapping for Emotion Digitization in Robotics", 2019 $3^{rd}$ International Conference on Bio-Engineering for Smart Technologies (Biosmart), IEEE, Apr. 24, 2019, pp. 1-5.

IN-SEAT ACTIVE NOISE CANCELLATION SYSTEM FOR MOVING VEHICLES

CROSS-REFERENCE TO RELATED APPLICATION(S)

This application is the U.S. national phase of International Application No. PCT/EP2021/065769 filed Jun. 11, 2021, which designated the U.S. and claims priority to EP 20179589.5 filed Jun. 11, 2020, the entire contents of each of which are hereby incorporated by reference.

The present invention relates to an active noise cancellation system placed in seats, in particular seats in vehicles.

The problem of noise in cabins of a vehicle (e.g. automobiles, trains, airplanes, busses, trucks, boats etc.) can be mitigated by active noise cancellation, in which a signal processing system is used in conjunction with speakers, microphones and reference transducers seeking to form an acoustic anti-noise signal identical to the noise but 180° out-of-phase so that the anti-noise signal cancels the noise perceived by a person sitting in a cabin seat.

One such system is described by in Berthilsson, A. et al.: "*MIMO Design of Active Noise Controllers for Car Interiors: Extending the Silenced Region at Higher Frequencies*", 2012 *American Control Conference, Fairmont Queen Elizabeth, Montréal, Canada, Jun. 27-Jun. 29, 2012*" where a matrix of microphones located around the position of the driver's head in an automobile is used together with the car build-in loudspeakers to perform noise cancellation.

In U.S. 10,347,236 a noise cancellation system is disclosed where one or more error microphones are located inside the headrest of the driver or passenger seat.

U.S. 9,424a,828 discloses a system where the car seat headrest has the speakers build-in together with a combination of microphones working together to form a virtual microphone located close to the passenger's ear.

Although prior art systems disclose the placement of microphones with the aim of modelling a virtual microphone at the seated person's ear, the actual positions of a person's ears can vary significantly relative to the estimated position such that performance of noise cancellation is strongly affected by the source of noise, the acoustic properties of the vehicle cabin and the placement and performance of the electro-acoustic transducers seeking to cancel the noise. Using a vehicle's in built sound system speakers is not optimal, inter alia because differences in noise between the left and right ear positions cannot be adequately compensated. Using a speaker positioned very close to the microphones, for instance in the headrest, as disclosed in U.S.9, 424a,828, can adversely influence the accuracy of the feedback loop by cancelling the noise at the position of the microphones while not cancelling the noise at the person's actual ear position in view of the large difference between the position and direction of the source of noise and the position and direction of the noise cancellation sound, relative to the microphones.

There are also constraints on the performance of noise cancellation systems used in vehicles due to needs of robustness, and accessibility while providing an economical system.

In view of the foregoing, an object of the invention is to provide an active noise cancellation system placed in seats which has accurate and effective noise cancellation over a range of variable parameters found in actual use situations.

For certain applications, a specific object of the invention is to provide an active noise cancellation system placed in seats of vehicles which has accurate and effective noise cancellation over a range of variable parameters found in actual use situations.

It is advantageous to provide an active noise cancellation system which is economical to produce and install.

It is advantageous to provide an active noise cancellation system which is effective in cancelling environmental noise while producing a high quality audio signal.

It is advantageous to provide an active noise cancellation system which is easy to integrate into existing vehicle cabin and seats with minimal modification of the general design and features of the vehicle cabin and seats.

It is advantageous to provide an active noise cancellation system that is easy to implement and that is cost effective.

Objects of this invention have been achieved by providing the active noise cancellation system according to claim 1.

Disclosed herein is an active noise cancellation system for cancelling environment noise perceived by a driver or passenger seated in a seat mounted in a cabin of a vehicle, in combination with said seat, the seat comprising a seat cushion, a seat back coupled to the seat cushion at a bottom end and extending upwards to a seat shoulder, and a headrest coupled to the seat back, extending upwardly from the seat shoulder, the active noise cancellation system comprising an adaptive noise cancellation (ANC) circuit, a plurality of microphones mounted in the headrest and connected electrically to the ANC circuit, and a plurality of speakers mounted in the seat and connected electrically to the ANC circuit. The plurality of microphones comprises at least one first microphone mounted on a right side of the headrest and at least one second microphone mounted on a left side of the headrest. The system further comprises one or more external vibration or noise transducers connected to the ANC circuit for detecting noise or vibrations generated outside of the vehicle cabin. The plurality of speakers comprise at least one first speaker mounted in the seat shoulder on a left side and at least one second speaker mounted in the seat shoulder on a right side.

The right speaker is configured to generate a noise cancellation sound from a noise signal picked up by the right microphone processed by the ANC circuit and from the noise detected from the one or more external vibration or noise transducers, and the left speaker is configured to generate a noise cancellation sound from a noise signal picked up by the left microphone processed by the ANC circuit and from the noise detected from the one or more external vibration or noise transducers.

In an advantageous embodiment, the speakers are directed towards a position in front of the headrest and at an angle of inclination of a centre axis of the speaker relative to a median plane of the seat back between 20° and 80°, preferably between 30° and 60°.

In an advantageous embodiment, the speakers are located in opposite corners of the seat shoulder.

In an advantageous embodiment, said plurality of microphones comprises at least two microphones mounted on a right side of the headrest and at least two microphones mounted on a left side of the headrest.

In an advantageous embodiment, plurality of microphones comprises at least three microphones mounted on a right side of the headrest and at three microphones mounted on a left side of the headrest.

In an advantageous embodiment, the plurality of microphones on said right side form a first microphone array generating a first virtual microphone on a right side of the seat intended for measuring noise at an estimated position of a seated person's right ear and wherein the plurality of microphones on said left side form a second virtual microphone array generating a second virtual microphone on a left side of the seat intended for measuring noise at an estimated position of a seated person's left ear.

In an advantageous embodiment, the active noise cancellation system and seat further comprises one or more additional error signal microphones positioned in a headlining above and in front of the headrest.

In an advantageous embodiment, the active noise cancellation system and seat further comprises one or more head position sensor(s) connected to the ANC circuit and positioned above and or in front of the seat head configured to detect a spatial position of the seated persons head.

In an advantageous embodiment, the one or more external vibration or noise transducers are piezoelectric or surface-acoustic wave transducers.

In an advantageous embodiment, an output of each microphone and the one or more external vibration or noise transducers is connected to a multiple-input fixed filter of the ANC circuit having filter coefficients stored in a memory of the ANC circuit configured with a phase response so that the resulting output of the fixed filter corresponds to a single virtual microphone for each of a left side and a right side.

In an advantageous embodiment, an output of the multiple-input fixed filter provides an error input to an adaptive filter training algorithm stored and executable in the ANC circuit.

In an advantageous embodiment, the ANC circuit comprises a first ADC and a first multiple input fixed filter for a right side and a second ADC and a second multiple input fixed filter for a left side, in a symmetric configuration.

In an advantageous embodiment, the ANC circuit comprises a spike-based neural network structure circuit receiving signals
- from said at least one first microphone mounted on a right side of the headrest and the external vibration or noise transducers on the body of vehicle, generating a first virtual microphone on a right side of the seat intended for measuring noise at an estimated position of a seated person's right ear and computing optimum coefficients for a fixed filter for the right ear, and
- from said at least one second microphone mounted on a left side of the headrest and the external vibration or noise transducers on the body of vehicle, generating a second virtual microphone on a left side of the seat intended for measuring noise at an estimated position of a seated person's left ear and computing optimum coefficients for a fixed filter for the left ear.

Also disclosed herein is an automobile comprising a chassis and a cabin or shell structure, and an active noise cancellation system and seat according to any of the above embodiments, wherein a plurality of said external vibration or noise transducers are mounted on the chassis, cabin or shell structure at different positions to capture road noise.

Also disclosed herein is an aircraft comprising a fuselage and engines, and an active noise cancellation system and seat according to any of the above embodiments, wherein a plurality of said external vibration or noise transducers are mounted on the fuselage at different positions to capture engine and wind noise.

Further objects and advantageous features of the invention will be apparent from the claims and the following detailed description of embodiments of the invention in relation to the annexed drawings in which:

Figure 1:
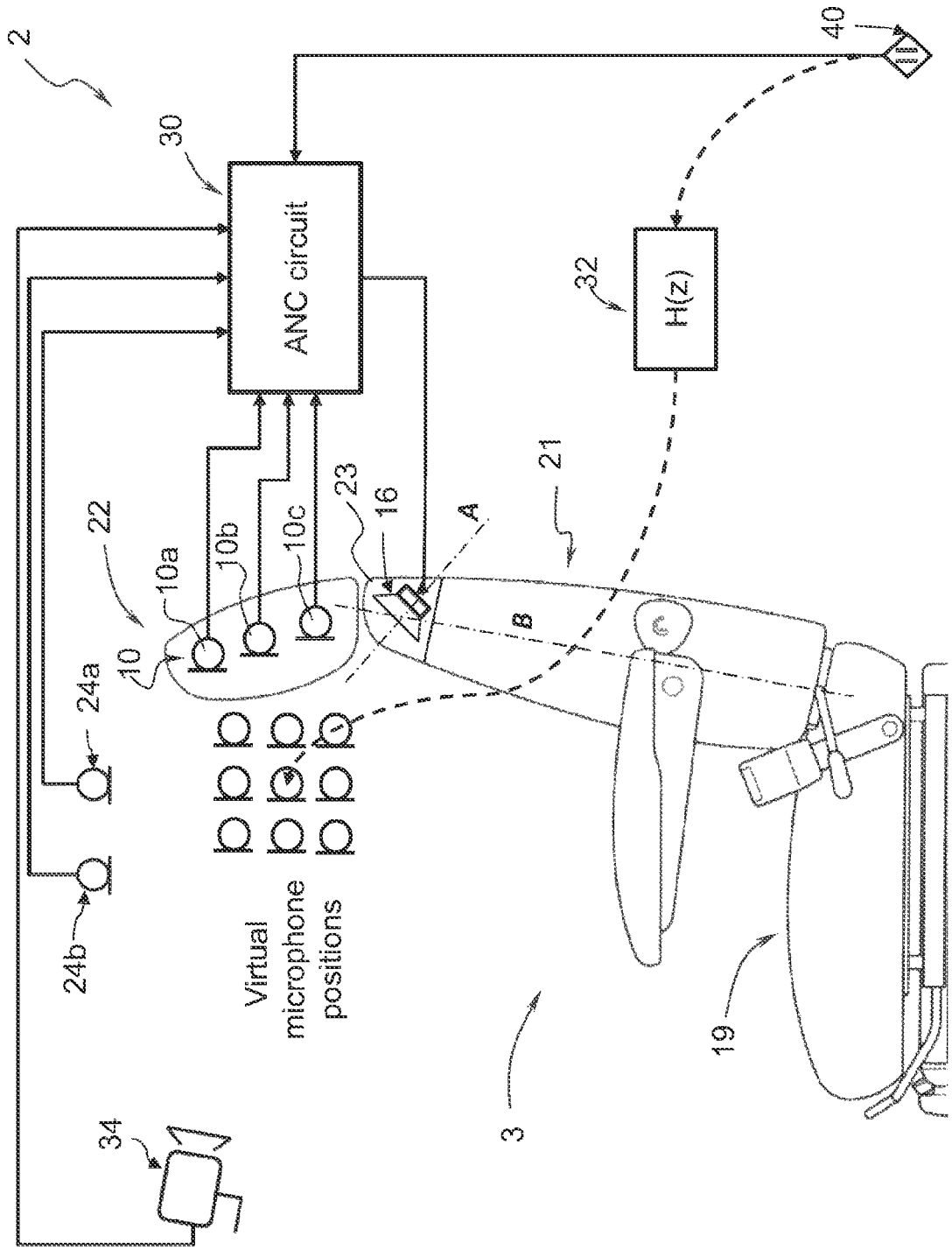
FIG. 1 is a schematic simplified illustration of an active noise cancellation system according to an embodiment of the invention integrated in a seat of a vehicle, for instance the seat of an aeroplane or a car.

Referring to the figures, an active noise cancellation system 1, in particular for cancelling environment noise perceived by a driver or passenger seated in a seat 3 mounted in a cabin of a vehicle, is schematically illustrated. The seat 3 comprises a seat cushion 19, a seat back 21 coupled, usually in an inclinable manner, to the seat cushion at a bottom end and extending upwards to a seat shoulder 23, and a headrest 22 coupled to the seat back, extending upwardly from the seat shoulder 23. The headrest 22 may be movably or removably coupled to the seat back, or may be integrally formed with, or fixedly assembled to, the seat back, as per se known in vehicle and other seats. If the headrest is integrally formed with the seat back it shall be understood herein that reference to the seat back refers to the portion of the seat back functionally intended to support a seated person's back, and reference to the headrest refers to the portion of the seat back above the seat shoulder portion functionally intended to provide a back rest for a seated person's head.

The active noise cancellation system 1 according to an embodiment of the invention comprises an adaptive noise cancellation (ANC) circuit 30, a plurality of microphones 10 mounted in the headrest 22 and connected electrically to the ANC circuit 30, a plurality of electro-acoustic transducers 16 (also called speakers 16) mounted in the seat shoulder 23 of the seat back 21 and connected electrically to the ANC circuit 30.

The active noise cancellation system 1 according to an embodiment of the invention may further comprise one or more additional error signal microphones 24a and 24b positioned within the cabin of the vehicle, preferably in the headlining above and in front of the headrest 22.

The active noise cancellation system 1 according to an embodiment of the invention may further comprise one (or more) head position sensor(s) 34. The head position sensor(s) may be one or more cameras 34 positioned above and or in front of the seat head rest. Other position sensors may be employed within the scope of the invention, for instance laser or infrared sensors or ultrasound sensors. The head position sensor(s) advantageously detect a spatial position of the seated persons head, in particular the position relative to three orthogonal axes—vertical, horizontal front to back, and horizontal side to side, and optionally a rotational position about the vertical axis. The transfer function for noise cancellation to control each of the noise cancellation speakers 16 can thus be adjusted as a function of the position of the person's head.

The active noise cancellation system 1 according to an embodiment of the invention may further comprise one or more external vibration or noise transducers 40 for detecting noise or vibrations, in particular generated outside of the vehicle cabin.

The adaptive noise cancellation (ANC) circuit 30 may be implemented using various combinations of analogue circuitry, digital circuitry, one or more microprocessors execution software instructions, Field Programmable Gate Arrays (FPGA's) or Application Specific Integrated Circuits (ASIC's) or Digital Signal Processing devices (DSP's). Signal lines between components may be discrete analogue lines or digital signal lines or signal streams represented by temporal values within a signal processing software implementation.

In an embodiment for road vehicles, an example of environmental noise that the active noise cancellation system 1 seeks to cancel includes noise and vibration that originates from an automobile wheel moving on a road surface.

Environmental noise may be sensed, at least partially, by one or more vibration or noise transducers 40 positioned externally of the vehicle cabin, for instance mechanically coupled to a suspension device or chassis component of the automobile. The vibration sensors may in particular comprise piezoelectric surface mounted sensors or surface acoustic wave (SAW) sensors. Advantageously, a plurality of vibration or noise transducers 40 mechanically coupled to a suspension device or chassis component 101 of the automobile 100 at different positions, for instance four or more transducers, some of which are positioned proximate each wheel, allow to estimate the source of the road noise. A trained neural network system with inputs from the external vibration or noise transducers and the one or more microphones incorporated in each side of headrest, can compute a resultant input signal of a virtual microphone situated at the estimated location of each ear of the person, allowing to generate with the speakers a noise cancellation signal directed to said estimated location of each ear of the person, seeking to cancel the resultant input signal at said estimated location of each ear.

In an automobile, road noise forms the mains source of noise to be cancelled in the cabin of the vehicle at the persons listening position. Capturing the road noise close to it's source, namely with the one or more external noise or vibration sensors 40 positioned externally of the vehicle cabin, advantageously allows to efficiently and optimally cancel noise in the cabin.

Vibration/noise transducers may include, but are not limited to, microphones, accelerometers, force gauges, linear variable differential transformers, strain gauges, and load cells. Single-axis and multi-axis accelerometers may be used to detect both magnitude and phase of acceleration as well to sense orientation and motion of the vehicle.

In other embodiments the active noise cancellation system 1 may be configured to cancel noise for passengers seated in a cabin of an airplane or a train. Environmental noise may be sensed, at least partially, by one or more vibration or noise transducers 40 positioned externally of the airplane fuselage or train cabin. In an aircraft 100, jet engine and wind noise forms the main source of noise to be cancelled in the cabin of the aircraft at the passengers' listening positions. Capturing the engine and wind noise close to it's source, namely with the one or more external noise or vibration sensors 40 positioned on the fuselage 102 of the aircraft, advantageously allows to efficiently and optimally cancel noise within the cabin.

The external environmental noise or vibration sensor, in conjunction with the microphones inside the vehicle cabin, advantageously allows to better predict and estimate the noise to be cancelled within the cabin, as compared to relying only on the microphones installed inside the vehicle cabin.

In an embodiment, the external noise or vibration sensor 40 may be in the form of an accelerometer sensor which generates input to an Analog-to-digital Converter (ADC) 42. The ADC 42 may in an embodiment be an integrated part of the accelerometer sensor 40 or in another embodiment, may be integrated in the electronics of the adaptive noise cancellation circuit 30. In a preferred embodiment, the vibration or noise sensors may in particular comprise piezoelectric surface mounted sensors or surface acoustic wave (SAW) sensors.

FIG. 1 illustrates one vibration or noise transducer 40 and one ADC 42, however in many practical applications there are preferably a plurality of vibration/noise transducers and ADC's each providing a signal with close correlation to the vibration or noise at a certain position in the vehicle. Examples hereof may be transducers mounted at the suspension of each wheel, which can be used to generate a signal closely representing the road noise coming from the vehicle wheels.

The one or more ADC converted noise signals is in one embodiment provided as input to an adaptive predictive filter 46 of the ANC circuit 30 having time-varying variable filter coefficients. ADC converted noise signals is also input to an adaptive filter training algorithm 48 which generates new filter coefficients to the adaptive predictive filter 46. The adaptive predictive filter 46 and the adaptive predictive filter training algorithm 48 receives multiple noise input. In embodiments, the adaptive predictive filter can be of the form xLMS, xRLS, xGLS, or any similar suitable algorithm.

In an advantageous embodiment of the invention, the adaptive predictive filter 46 generates at least two outputs, one for a first Digital-to-Analog Converter (DAC) 50, and one for a second Digital-to-Analog Converter (DAC) 52. The first DAC produces a noise cancellation signal for input to the right side speaker 16a and the second DAC produces a noise cancellation signal for input to the left side speaker 16b.

The DAC's 50a, 50b convert the adaptive filtered signals to analog audio signals which are then amplified by amplifiers 54a, 54b before they are transduced to acoustic energy by respective right and left speakers 16a, 16b. The acoustic audio signal generated by the left and right speakers 16a, 16b has an inter-amplitude and inter-phase relationship so that the superposition of the left and right acoustic speaker output has an amplitude equivalent to, and an 180° opposite phase to, the superposition of all the noise signals sensed by the one or more noise transducers 40, at the left and right ear positions of a listener.

In an embodiment the adaptive predictive filter 46 may advantageously further generate output for one or more DAC's and speakers (not shown) integrated into the sides and of the vehicle cabin, so these also can be included in the generation of noise cancelling acoustic energy. The adaptive predictive filter 46 may further generate output for one or more DAC's and speakers (not shown) installed at other positions in the vehicle cabin such as in the dashboard, back panel, roof, or floor, so these also can be included in the generation of noise cancelling acoustic energy.

A plurality of microphones 10a, 10b, 10c are installed on each side of the headrest 22. There are at least two microphones on each side of the headrest, but preferably three or more microphones on each side of the headrest.

The plurality of microphones on at least one side of the headrest forms a microphone array. Each microphone output is converted to a digital representation using an Analog-to-Digital Converter (ADC) 58.

It may be noted that the ADC circuits 42, 58 may be directly integrated in the respective transducers 40, 10 that may be configured to output digital signals rather than analog signals. In the case where the microphones and noise or vibration sensors output digital signals, they may be connected directly to digital inputs of the ANC circuit, otherwise, if the transducers output analog signals, they may be connected to an ADC in the ANC circuit or between the ANC circuit and the transducers.

Figure 2:
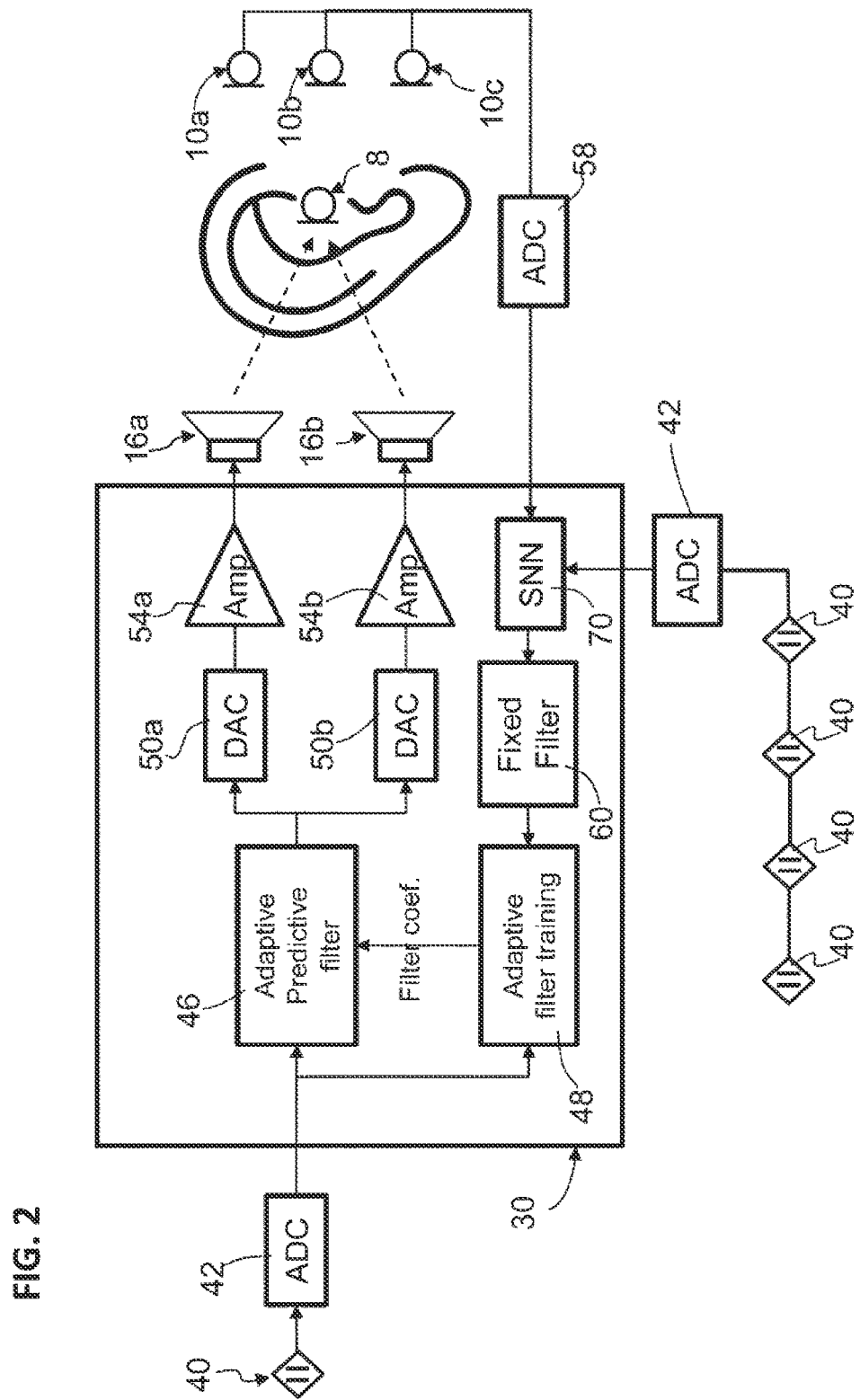
FIG. 2 is a schematic block diagram of a signal processing arrangement of an active noise cancellation system according to an embodiment of the invention.
Figure 2A:
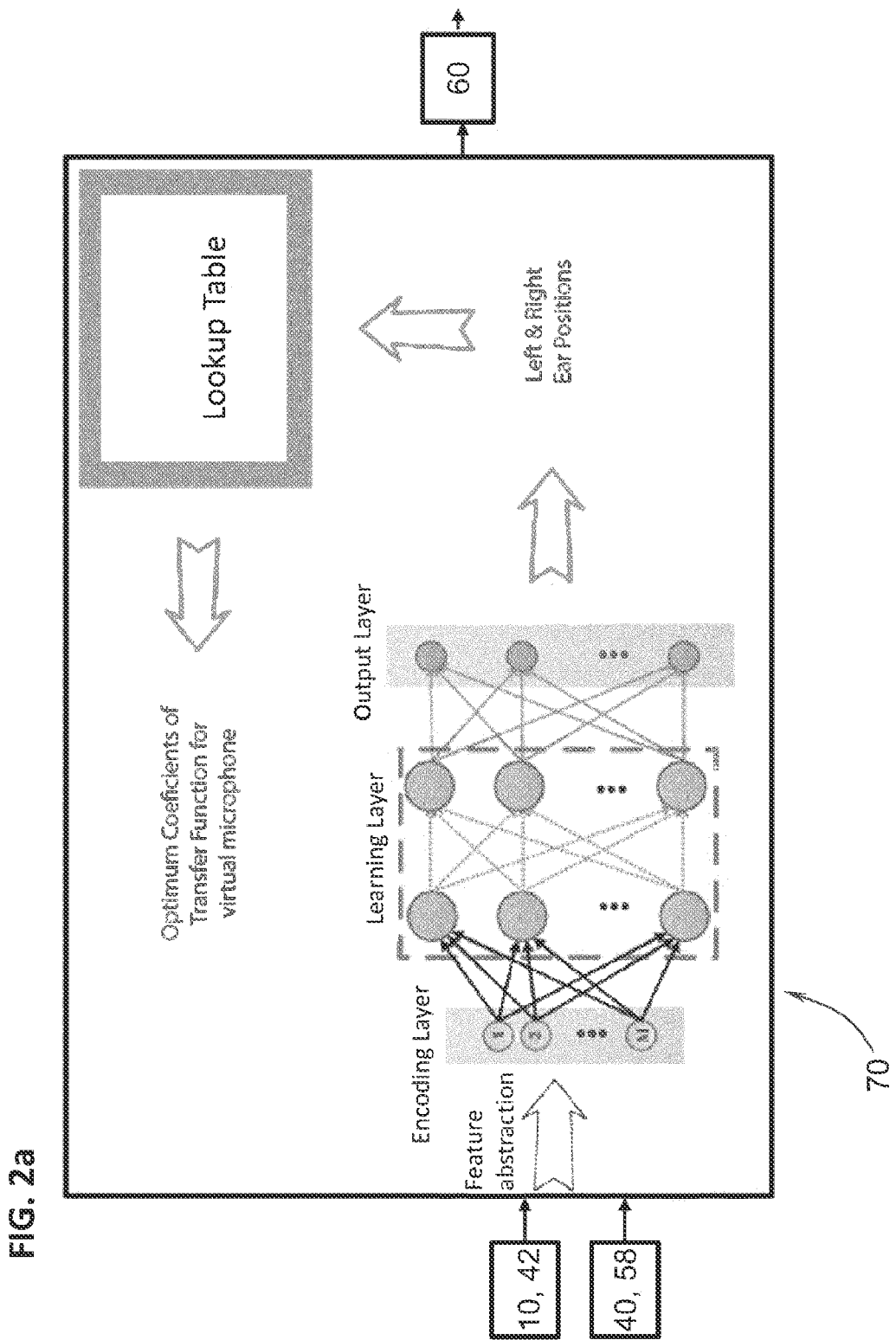
FIG. 2a is a schematic block diagram of a filter portion of the signal processing arrangement of FIG. 2, illustrating a neural network based arrangement according to an embodiment of the invention, where the fixed filters coefficients to virtual microphones for both left and right ears is computed using an AI-based algorithm.

In an embodiment, as best illustrated in FIGS. 2 and 2a, the ANC circuit 30 comprises a neural network circuit 70, for instance a spike-based neural network (SNN) structure, configured to receive the signals from the sound transducers 10, 40 and compute optimum coefficients of transfer functions for a virtual microphone 8 on the left ear side and a virtual microphone 8 on the right ear side.

The neural network circuit 70 receives the signals from the plurality of microphones 10 on said right side from a first microphone array and the installed SAW sensors 40 on the body 101, 102 of vehicle, to estimate the position of the virtual right microphone, and then outputting the optimum coefficients of a transfer function for the fixed filter for the right ear noise cancellation. The neural network circuit 70 also receives the signals from the plurality of microphones 10 on said left side from a second microphone array and the installed SAW sensors 40 on the body 101, 102 of the vehicle, to estimate the position of the virtual left microphone 8, and then outputting the optimum coefficients of a transfer function for the fixed filter for the left ear noise cancellation.

The digital microphone and external vibration sensor signals may then be filtered through a fixed multiple-input filter 60. The multiple-input fixed filter 60 may have filter coefficients stored in a memory of the ANC circuit 30 configured with a phase response so that the resulting output of the fixed filter corresponds to a single virtual microphone 8 at the estimated average position of the listeners ear. The stored filter coefficients may consist of the optimum coefficients of the transfer function output by the neural network circuit 70 and that are stored in the memory for use by the fixed filter circuit.

The fixed filter output may advantageously be used as error input to an adaptive filter training algorithm 48 executed in the ANC circuit 30. The adaptive filter training algorithm seeks to minimize its error input meaning that the remaining noise energy at the position of the virtual microphone 8 at the listener's ear is adaptively minimized.

A single virtual microphone for either the right side (listener's right ear) or the left side (listener's left ear) can be provided, or a pair of virtual microphones, one for each of the left side and ride side, may be provided. In a preferred embodiment both side arrays of microphones form virtual microphones at the respective left and right positions of the listener's ears, and there may advantageously be provided a first fixed filter 60 for one side and a second fixed filter 60 for the other side, in a symmetric configuration.

Figure 3:
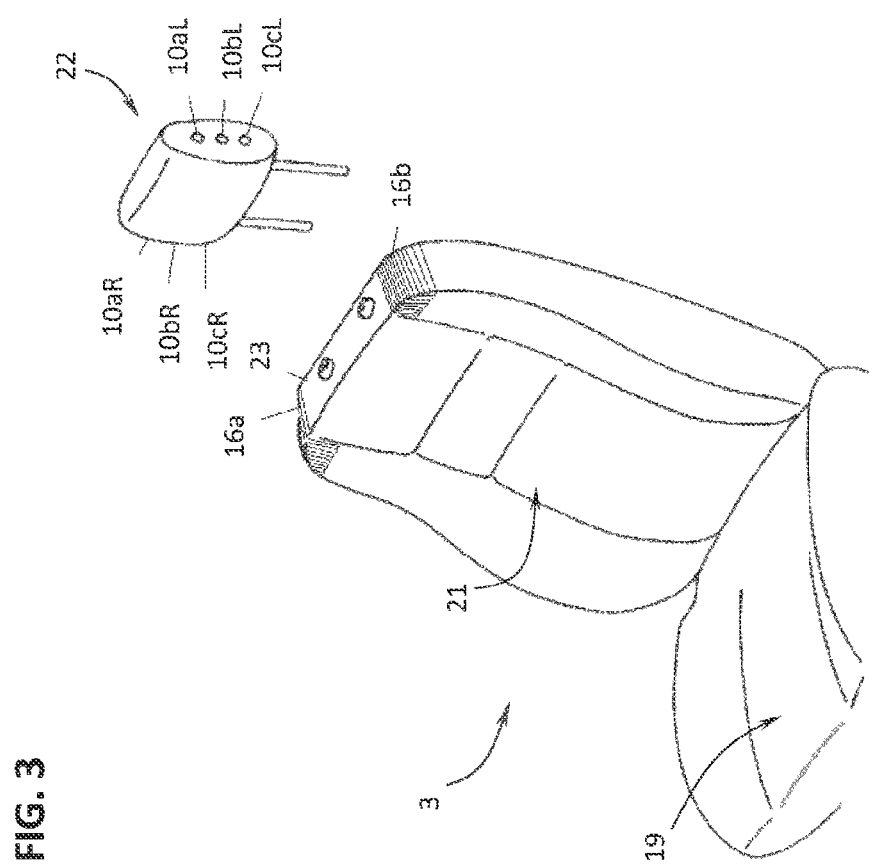
FIG. 3 is a schematic illustration of a seat with an active noise cancellation system according to an embodiment of the invention.
Figure 5:
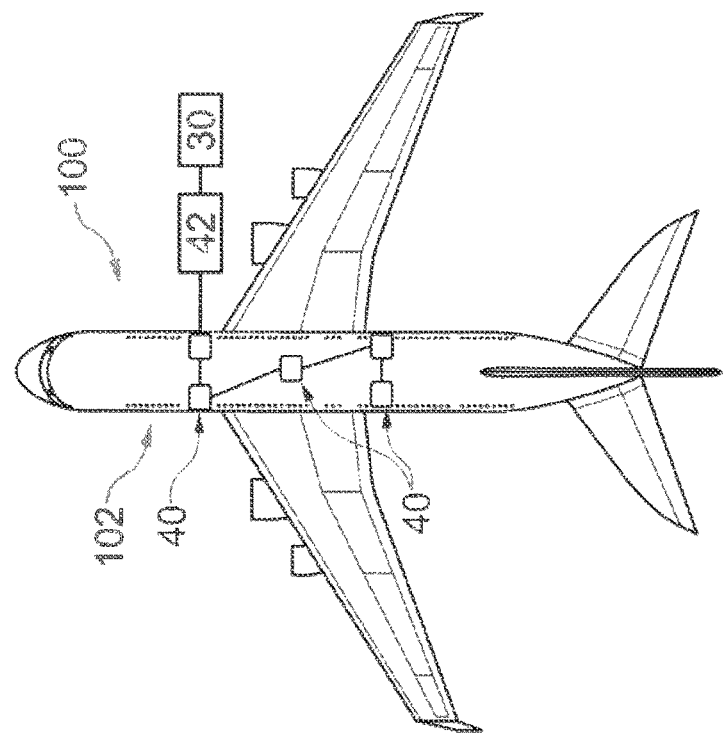
FIG. 5 is a schematic illustration of an aeroplane with an active noise cancellation system according to an embodiment of the invention.
Figure 4:
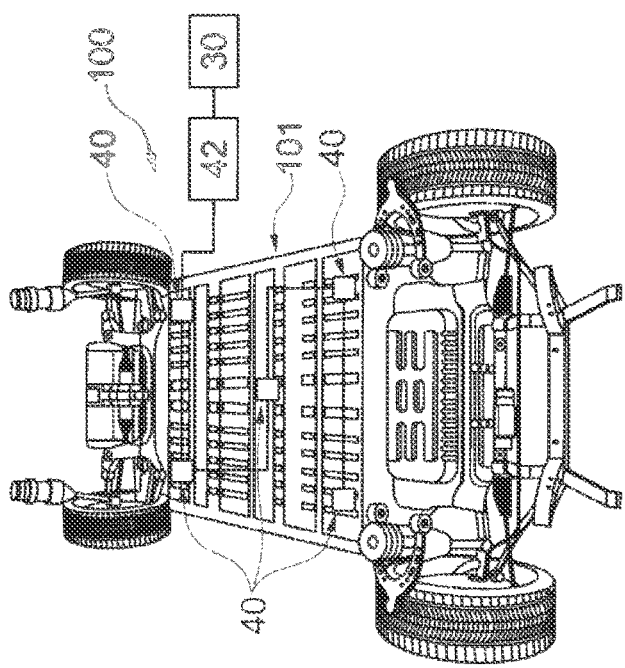
FIG. 4 is an illustration of an automobile chassis and wheels with an active noise cancellation system according to an embodiment of the invention.

FIG. 3 illustrates a car seat 20 and a headrest 22 equipped with transducers for use in a noise cancellation configuration intended for cancelling road noise. The headrest 22 includes a left side surface in which the microphones 1aL, 10bL and 10cL are integrated. The headrest 22 also includes a right-side surface in which microphones 10aR, 10bR and 10cR are integrated. The seat 20 has a left speaker 16a integrated in the left shoulder of the seat and a right speaker 16b integrated into its right shoulder.

The left speaker 16a and right speaker 16b is advantageously covered with protective means in order to prevent damage to the speaker during everyday use.

In embodiments of the invention, various Adaptive Noise Cancellation algorithms based on xNLMS, xRLS or GLS algorithms, may be used.

The example illustrated in FIG. 1 shows an airplane seat where vibration or acoustic noise is sensed by one or more external transducers 40 feeding a signal representing of the unwanted noise energy to an input of the Adaptive Noise Cancellation circuit 30. The actual noise produced near the noise transducer 40 is in general undergoing a frequency and phase shaping modelled by an unknown filter transfer function H(z) 32. The purpose of the combined transfer function of the noise transducer 40, the adaptive noise cancellation (ANC) circuit 30 and the electro acoustic transducers 16a and 16b located in the shoulders of the airplane seat is to produce an acoustic signal at the listening position of the persons sitting in the seat, so that the acoustic signal is identical to the noise signal filtered through the unknown transfer function H(z) 32 but with 180° opposite phase.

The orientation of the electro acoustic transducers 16, 16a, 16b are advantageously directed towards a position about 10-20 cm in front of the headrest corresponding to an estimated average position of a listener's ear. The angle of inclination of a centre axis A of the speaker relative to the median plane B of the seat back 21 is preferably between 20 and 80°, more preferably in many applications between 30 and 60°, for instance approximately 45°, so that the speaker sound is directed towards the listener's estimated ear position. The electro acoustic transducers 16a, 16b are located preferably in opposite corners of the seat shoulder 23.

The position of the noise cancellation speakers in the seat back on left and right sides of the seat in conjunction with the left and right arrays of microphones in the headrest, is particularly advantageous for very effective noise cancellation because of the relative locations and orientations of the microphone arrays and speakers with respect to each other and with respect to the listener's estimated ear position. In particular the speakers 16 are separated from the microphones 10 sufficiently to avoid excessive interference with noise cancellation signal to be picked up by the microphones, while at the same time being at a relatively short distance from the listener's estimated ear positions to produce an effective noise cancellation sound adjusted optimally for each of the left and right sides. Moreover, the seat shoulder provides a convenient and relatively spacious and robust support for mounting of the speakers.

In an embodiment the microphones 10a 10b and 10c in the headrest may be supplemented with one or more additional error signal microphones 24a, 24b positioned above and in front of the seat headrest, for instance integrated in the headlining or roof of the cabin. The headrest microphones 10a, 10b, 10c in conjunction with the headliner microphone(s) 24a, 24b may together form left and right side virtual microphones 8. It may be noted that the additional microphones may be positioned in the headlining above each seat in the vehicle cabin that is provided with the noise cancellation system.

In an embodiment the specific position of the listeners head and ears is determined using suitable head tracking means 34. In a preferred embodiment, for instance as illustrated in FIG. 1, the head-tracking is enabled by a camera 34 with suitable image processing means. The output of the head tracking camera 34 is input to the Adaptive Noise Cancelling circuit 30, so that the fixed filter 60 has its filter coefficients selected among a set of filter coefficients, where each discrete set represent a specific desired virtual microphone position. The ANC circuit 30 then uses the signal from the virtual microphone specifically at the ear positions of the listener as an error signal in the adaptive training algorithm so that the resulting noise perceived by the listener is minimized.

LIST OF REFERENCES

Active noise cancellation system 1
Speakers (electro acoustic transducers) 16
   right speaker 16a
   left speaker 16b
Microphones 10, 10a, 10b, 10c
   right array 10aR, 10bR, 10cR
   left array 10aL, 10bL, 10cL
     virtual microphone 8
Seat 3
   seat cushion 19
   seat back 21
     seat shoulder 23
   headrest 22
Noise sensor 40 (external transducers)
   e.g. accelerometer
   Analog-to-digital Converter (ADC) 42
Adaptive Noise Cancellation (ANC) circuit 30
   adaptive filter training algorithm 48
   Adaptive predictive filter 46
   fixed filter 60 (fixed multiple-input filter 60)
   Digital-to-Analog Converters (DAC) 50, 50a, 50b
   Analog-to-Digital Converters (ADC) 58
   unknown filter transfer function H(z) 32
   amplifiers 54, 54a, 54b
   neural network circuit 70
     e.g. spike neural network circuit (SNN)
Headliner microphones 24, 24a, 24b
Head tracking camera 34
Vehicle 100
   Automobile
     Chassis 101
   Aircraft
     Fuselage 102

The invention claimed is:

1. An active noise cancellation system for cancelling environment noise perceived by a driver or passenger seated in a seat mounted in a cabin of a vehicle, in combination with said seat, the seat comprising a seat cushion, a seat back coupled to the seat cushion at a bottom end and extending upwards to a seat shoulder, and a headrest coupled to the seat back, extending upwardly from the seat shoulder, the active noise cancellation system comprising an adaptive noise cancellation (ANC) circuit, a plurality of microphones mounted in the headrest and connected electrically to the ANC circuit, a plurality of speakers mounted in the seat and connected electrically to the ANC circuit, said plurality of microphones comprising at least one right microphone mounted on a right side of the headrest and at least one left microphone mounted on a left side of the headrest, the system further comprising one or more external vibration or noise transducers mounted on the chassis, shell structure, or fuselage of the vehicle and connected to the ANC circuit for detecting noise or vibrations generated outside of the vehicle cabin, and wherein the plurality of speakers comprise at least one left speaker mounted in the seat shoulder on a left side and at least one right speaker mounted in the seat shoulder on a right side, the at least one right speaker configured to generate a noise cancellation sound from a noise signal picked up by the at least one right microphone processed by the ANC circuit and from the noise detected from the one or more external vibration or noise transducers, and the at least one left speaker configured to generate a noise cancellation sound from a noise signal picked up by the at least one left microphone processed by the ANC circuit and from the noise detected from the one or more external vibration or noise transducers, a plurality of right microphones on said right side form a right microphone array generating a right virtual microphone on a right side of the seat for measuring noise at an estimated position of a seated person's right ear and wherein a plurality of left microphones on said left side form a left microphone array generating a left virtual microphone on a left side of the seat for measuring noise at an estimated position of a seated person's left ear.

2. Active noise cancellation system and seat according to claim 1, wherein the plurality of speakers are directed towards a position in front of the headrest and at an angle of inclination of a centre axis (A) of each of the plurality of speakers relative to a median plane (B) of the seat back between 20° and 80°, preferably between 30° and 60°.

3. Active noise cancellation system and seat according to claim 1, wherein the at least one left speaker and the at least one right speaker are located in opposite corners of the seat shoulder.

4. Active noise cancellation system and seat according to claim 3, wherein said plurality of microphones comprises at least two right microphones mounted on the right side of the headrest and at least two left microphones mounted on the left side of the headrest.

5. Active noise cancellation system and seat according to claim 4, wherein said plurality of microphones comprises at least three right microphones mounted on the right side of the headrest and at least three left microphones mounted on the left side of the headrest.

6. Active noise cancellation system and seat according to claim 1, further comprising one or more additional error signal microphones positioned in a headlining above and in front of the headrest.

7. Active noise cancellation system and seat according to claim 1, further comprising one or more head position sensor(s) connected to the ANC circuit and positioned above and or in front of the seat head configured to detect a spatial position of the seated person's head.

8. Active noise cancellation system and seat according to claim 1, wherein the one or more external vibration or noise transducers are piezoelectric or surface-acoustic wave transducers.

9. Active noise cancellation system and seat according to claim 1, wherein an output of each of the plurality of microphones and the one or more external vibration or noise transducers is connected to a multiple-input fixed filter of the ANC circuit having filter coefficients stored in a memory of the ANC circuit configured with a phase response so that the resulting output of the fixed filter corresponds to a single virtual microphone for each of the left side and the right side.

10. Active noise cancellation system and seat according to claim 9, wherein an output of the multiple-input fixed filter provides an error input to an adaptive filter training algorithm stored and executable in the ANC circuit.

11. Active noise cancellation system and seat according to claim 1, wherein the ANC circuit comprises a right multiple input fixed filter for the right side and a left multiple input fixed filter for the left side, in a symmetric configuration.

12. Active noise cancellation system and seat according to claim 1, wherein the ANC circuit comprises a spike-based neural network circuit receiving signals from said at least one right microphone mounted on the right side of the headrest and the external vibration or noise transducers on the body of a vehicle, generating the right virtual microphone on the right side of the seat for measuring noise at an estimated position of a seated person's right ear and computing optimum transfer function coefficients for a fixed filter for the right ear, and from said at least one left microphone mounted on the left side of the headrest and the external vibration or noise transducers on the body of vehicle, generating the left virtual microphone on the left side of the seat for measuring noise at an estimated position of a seated person's left ear and computing optimum transfer function coefficients for a the fixed filter for the left ear.

13. Automobile comprising a chassis and a cabin or shell structure, and an active noise cancellation system and seat according to claim 1, wherein a plurality of said external vibration or noise transducers are mounted on the chassis, cabin or shell structure at different positions to capture road noise.

14. Aircraft comprising a fuselage and engines, and an active noise cancellation system and seat according to claim 1, wherein a plurality of said external vibration or noise transducers are mounted on the fuselage at different positions to capture engine and wind noise.

15. Active noise cancellation system and seat according to claim 1, wherein the plurality of speakers are directed towards a position in front of the headrest and at an angle of inclination of a centre axis (A) of each of the plurality of the speakers relative to a median plane (B) of the seat back between 30° and 60°.

* * * * *